(12) United States Patent
Kech et al.

(10) Patent No.: US 10,424,930 B2
(45) Date of Patent: Sep. 24, 2019

(54) LEVEL MEASURING DEVICE HAVING A SERIAL ARRANGEMENT OF FUNCTIONAL UNITS

(71) Applicant: VEGA GRIESHABER KG, Wolfach (DE)

(72) Inventors: Guenter Kech, Wolfach (DE); Thomas Deck, Wolfach (DE); Karl Griessbaum, Muehlenbach (DE)

(73) Assignee: VEGA GRIESHABER KG, Wolfach (DE)

( * ) Notice: Subject to any disclaimer, the term of this patent is extended or adjusted under 35 U.S.C. 154(b) by 301 days.

(21) Appl. No.: 15/380,905

(22) Filed: Dec. 15, 2016

(65) Prior Publication Data

US 2017/0170659 A1    Jun. 15, 2017

(30) Foreign Application Priority Data

Dec. 15, 2015 (DE) .......................... 10 2015 225 297

(51) Int. Cl.
| | | |
|---|---|---|
| *H02J 3/28* | (2006.01) | |
| *H02J 7/34* | (2006.01) | |
| *G01F 23/292* | (2006.01) | |
| *G01F 23/00* | (2006.01) | |
| *H02J 1/02* | (2006.01) | |
| *G01F 23/28* | (2006.01) | |
| *H02J 1/06* | (2006.01) | |

(Continued)

(52) U.S. Cl.
CPC ............ *H02J 3/28* (2013.01); *G01F 23/0061* (2013.01); *G01F 23/0069* (2013.01); *G01F 23/28* (2013.01); *G01F 23/292* (2013.01); *H02J 1/02* (2013.01); *H02J 1/06* (2013.01); *H02J 1/102* (2013.01); *H02J 7/345* (2013.01); *G01F 23/284* (2013.01); *G01F 23/2962* (2013.01); *H02J 2001/106* (2013.01)

(58) Field of Classification Search
CPC ...... H02J 1/06; H02J 3/28; H02J 7/345; H02J 1/08; G01F 23/2962
USPC ...................................................... 73/290 R
See application file for complete search history.

(56) References Cited

U.S. PATENT DOCUMENTS

| | | | |
|---|---|---|---|
| 6,014,100 A | | 1/2000 | Fehrenbach et al. |
| 6,070,114 A | * | 5/2000 | Fendt ...................... B60R 21/01 307/10.1 |

(Continued)

FOREIGN PATENT DOCUMENTS

| | | |
|---|---|---|
| DE | 196 43 013 C1 | 2/1998 |
| DE | 10 2007 006 027 A1 | 8/2008 |

(Continued)

*Primary Examiner* — Eric S. McCall
*Assistant Examiner* — Timothy P Graves
(74) *Attorney, Agent, or Firm* — Oblon, McClelland, Maier & Neustadt, L.L.P.

(57) ABSTRACT

There is provided a level measuring device including at least two electrical circuits connected in series with respect to an external power supply of the level measuring device. A decoupling circuit is disposed between the electrical circuits and is configured to distribute available power between the two electrical circuits according to requirements. At least the second electrical circuit includes an energy store as an energy buffer configured to equalize a fluctuating energy consumption of the second electrical circuit such that a start time of the level measuring device can be shortened.

12 Claims, 6 Drawing Sheets

(51) Int. Cl.
*H02J 1/10* (2006.01)
*G01F 23/284* (2006.01)
*G01F 23/296* (2006.01)

(56) References Cited

U.S. PATENT DOCUMENTS

| | | |
|---|---|---|
| 2004/0183550 A1 | 9/2004 | Fehrenbach et al. |
| 2007/0176823 A1 | 8/2007 | Griessbaum et al. |
| 2008/0074309 A1 | 3/2008 | Nilsson |
| 2011/0093129 A1* | 4/2011 | Nilsson ................ G01F 23/284 700/295 |

FOREIGN PATENT DOCUMENTS

| | | |
|---|---|---|
| EP | 1 989 519 A1 | 11/2008 |
| WO | WO 2008/119996 A1 | 10/2008 |
| WO | WO 2011/049523 A1 | 4/2011 |

\* cited by examiner

LEVEL MEASURING DEVICE HAVING A SERIAL ARRANGEMENT OF FUNCTIONAL UNITS

CROSS-REFERENCE TO RELATED APPLICATION

This application claims the benefit of the filing date of German Patent Application No. 10 2015 225 297.3, filed on 15 Dec. 2015, the disclosure of which is hereby incorporated herein by reference.

FIELD

The invention relates to a level measuring device having a serial arrangement of functional units. In particular, the invention relates to a level measuring device in the form of a transit-time sensor, which functions according to the radar, Time Domain Reflectometry (TDR), or ultrasound principle.

BACKGROUND

Level measuring devices and in particular, transit-time sensors for level measurement, which function according to the radar, TDR, or ultrasound principle, often have highly fluctuating energy consumption, which is brought about by the change from energy-intensive measuring phases and evaluation phases or pause times having a much lower power requirement.

The level measuring devices each have different functional units, which are, in particular, sensor electronics, measuring electronics and the communication circuit. One or more of these functional units normally exhibits a highly fluctuating power requirement. "Highly fluctuating" means that the maximum power consumption of this functional unit is greater than, for example, three times the average power consumption of the functional unit, or is greater than ten times the minimum power consumption of the functional unit.

If such a level measuring device is connected to a two-wire loop, the power consumption is at least temporarily constant and fixed, due to the two-wire operation (4 mA-20 mA or constant current having superimposed digital communication), and the resultant electrical power currently available can be lower than a current power required in the measuring phase.

This results in a buffer being required for energy storage in order to bridge a temporary power deficit. This buffer or energy store is arranged centrally and acts as an energy buffer for all of the functional and circuitry units of the sensor.

SUMMARY

The claimed invention provides a level measuring device for connection to an external power supply, which device exhibits efficient energy management.

This is achieved by the features of the independent claim. Developments of the claimed invention can be found in the dependent claims and the following description.

Consistent with an embodiment, a level measuring device is provided, which has a first functional unit, a second functional unit, a first energy store and a decoupling circuit. The two functional units are connected in series with respect to an external power supply of the level measuring device.

The external power supply is, for example, a two-wire loop (having a constant operating current or having a current signal 4 mA-20 mA).

As used herein, the terms "functional unit" and "functional units" refer to various circuit parts, electronics, electrical circuitry, and/or circuitry components of the level measuring device consistent with the disclosed embodiments.

The first energy store is designed as an energy buffer to equalise a fluctuating power consumption of the second functional unit and is connected thereto for this purpose. This energy buffer accumulates power from the external power supply, stores it and can release it at the given time to the second functional unit.

The first decoupling circuit is arranged between the first functional unit and the second functional unit and is designed to distribute the available electrical energy/power, which is supplied by the external power supply to the level measuring device, between the first functional unit and the second functional unit, according to their requirements, i.e., their actual or expected future power consumption, for example, and/or according to a predetermined distribution scheme.

For example, it can be provided for the first functional unit to be preferably supplied with power first and for this excess power to be released to the second functional unit and/or to the first energy store only when excess power is available in the process. In this manner, it can be ensured that the first functional unit is always supplied with sufficient power for its operation and, if the amount of available power is correspondingly low, the second functional unit and the first energy store are temporarily not supplied with any power or only to a low extent.

According to an embodiment, the first decoupling circuit is designed to prevent a current flow from the first energy store to the first functional unit. This can occur, for example, by the arrangement of a diode.

According to a further embodiment, the first functional unit is arranged upstream of the second functional unit relative to the external power supply of the level measuring device.

The decoupling circuit can be designed to prevent electricity flowing from the second functional unit and the first energy store towards the connections of the level measuring device to the external power supply (and therefore towards the first functional unit).

As a result of this, the first energy store can be prevented from releasing power to the first functional unit.

According to a further embodiment, the level measuring device has a third functional unit, which is arranged in series with the first and second functional unit with respect to the external power supply and between the first and the second functional unit. In this case, the level measuring device has a second decoupling circuit, which is arranged between the first functional unit and the third functional unit and is designed to distribute the available power from the external power supply between the first functional unit and the third functional unit, according to their requirements.

According to a further embodiment, a second energy store can be provided, which is designed as an energy buffer to equalise fluctuating power consumption of the third functional unit.

In addition, further functional units can be provided, which are arranged in series with the other functional units, and if applicable, corresponding energy stores can be assigned to said functional units.

According to a further embodiment, the second functional unit has fluctuating power consumption, which at a maximum is more than three times as high as the average power consumption of the second functional unit.

The second functional unit therefore has highly fluctuating power consumption, the peak requirements of which are buffered by the corresponding energy store.

According to a further embodiment, the first functional unit is a communication circuit of the level measuring device.

According to a further embodiment, the second functional unit is the measuring circuit or the sensor circuit of the level measuring device.

According to a further embodiment, the level measuring device is designed to connect to a 4 mA-20 mA two-wire loop, via which the level measuring device can be supplied with power for the measuring operation and via which the measured value can be communicated to an external device.

According to a further embodiment, the level measuring device has a control unit to control at least one of the decoupling circuits and therefore at least one of the distributions of the available power from the external power supply between the first functional unit and the second functional unit, according to their requirements.

Depending on the measuring phase, operating state of the various functional units and the charging state of the individual energy stores, the decoupling circuits can be adjusted such that only precisely the amount of power that is not required, for example, by the functional units arranged upstream thereof flows through the corresponding decoupling circuit.

Embodiments of the claimed invention are described in the following with reference to the drawings.

BRIEF DESCRIPTION OF THE DRAWINGS

The drawings are schematic and not to scale.

DETAILED DESCRIPTION OF EMBODIMENTS

Figure 1:
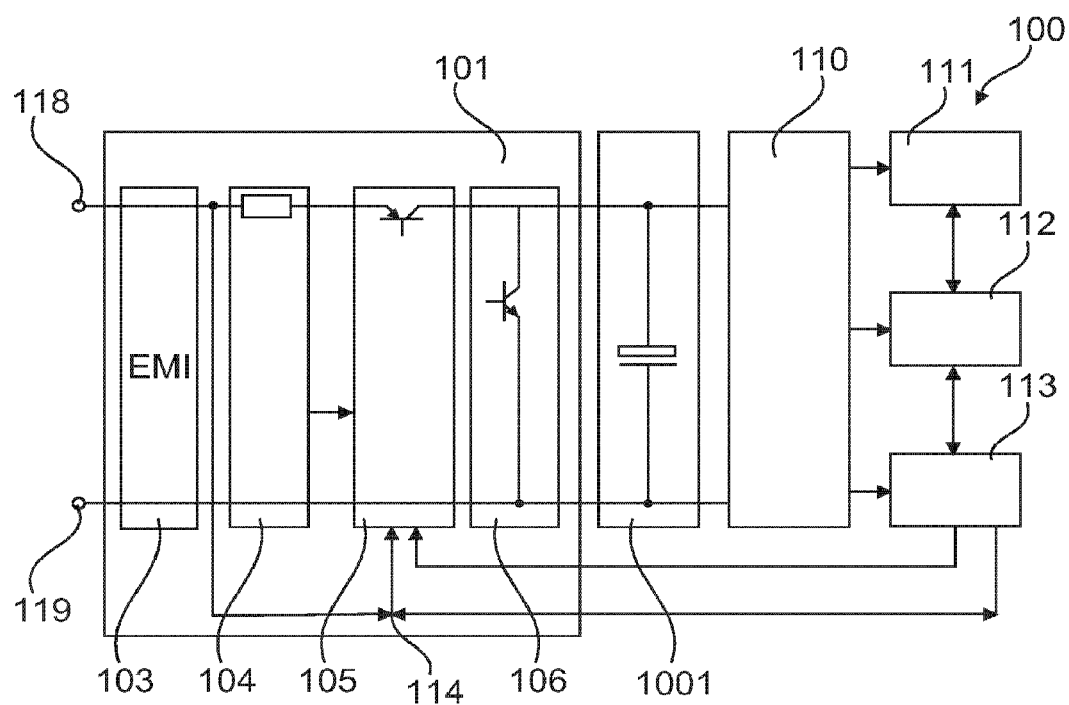
FIG. 1 is a block diagram of a level measuring device according to an embodiment.

If the same reference numerals are used in different figures in the following description, then these denote identical or similar elements. Identical or similar elements can, however, also be denoted by different reference numerals.

FIG. 1 is a block diagram of a level measuring device 100. The level measuring device 100 has a sensor loop interface 101, which comprises an electromagnetic compatibility (EMC) input circuit 103 for current limitation, voltage limitation, EMC filtering and, if applicable, explosion protection. In addition, the interface 101 has a regulator 105 for the loop current having a loop current actual-value acquisition device 104, a loop current target value setting and a shunt 106.

The loop current actual-value acquisition device (current sense) 104 serves to sense the current actual value as an input variable for the current regulator 105.

The current regulator 105 serves to adjust the loop current to the desired output current, which represents the measured value in the current loop in the embodiment shown. It compares the current actual value to the current target value, which is provided on a communication circuit 113.

This form of analogue measured value transmission via the two-wire line is, for example, known as a 4 mA-20 mA two-wire loop and is widespread.

It should be noted that transmitting the measured value digitally via a two-wire line is likewise known. In this case, for example, the loop current is kept on average constant by the current regulator 105. The measured value can be transmitted in digitalised form by modulation of the current using a corresponding alternating voltage signal.

The shunt 106 diverts the portion of the total current (loop current) that is not taken up by the following circuit of the sensor. It is designed to limit the voltage or regulate the voltage (for example, to regulate a predetermined voltage drop via the series pass transistor of the current regulator 105).

If digital communication between the level measuring device 100 and a remote station, which is not shown, is to take place via the two-wire line in addition to the analogue measured value transmission or instead of the analogue measured value transmission, this can, for example, occur using standardised Highway Addressable Remote Transducer (HART) communication.

A HART modem can be located at position 114 for this purpose, and receives the HART request signal from the master (not shown) and modulates the HART response signal to the loop current via the current regulator 105. It receives and conveys HART data from/to the communication circuit 113.

The energy store 1001 serves the purpose of buffering energy to equalise peaks in power requirements. It discharges following the disconnection of the sensor from the current loop and must be charged over a long period of time after it has been switched on (connection of the sensor to the current loop). The size of the energy store 1001 is determined by the ratio of the average power consumption to the maximum power consumption of the sensor and by the margin between the maximum and minimum voltage at the buffer capacitor 1001.

The power supply shown in the following drawings 110 can be designed as a power supply circuit for supplying all functional units (circuit parts) and contains, for example, switching regulators (step-down regulator, step-up regulator), voltage regulators, and/or smoothing capacitors.

The sensor electronics 111, which is also a functional unit of the level measuring device, is a circuit part for generating an electrical sensor signal, which is associated with the measured value or from which the measured value can be calculated or derived. It serves to convert a physical measured value (for example the transit time of the measured signal from the sensor to the filling-material surface and back) into an electrical signal (for example an echo curve) and contains, for example, high frequency circuit parts such as transmitter, receiver, coupler, antenna, mixer, or amplifier.

The measuring electronics 112, which is also a functional unit of the level measuring device, is a circuit part for evaluating the electrical sensor signal and for calculating or deriving a corresponding measured value from the electrical sensor signal, for example in the form of echo curve evaluation and/or spurious echo handling. It controls the cyclically repeated measurement and organises the power management.

The communication circuit 113, which is also a functional unit of the level measuring device, organises the communication of the level measuring device with the outside world, transmits the output value (current value) to the current regulator, organises the HART communication, organises the communication with an optional display and operating unit (not shown) and can have circuit parts for wireless communication.

The level measuring device 100 can be connected to the external power supply (not shown) via the ports 118, 119. The external power supply may be, for example, a two-wire supply and evaluation device. The two-wire line (for example a 4 mA-20 mA two-wire line) connects the ports 118, 119 of the level measuring device 100 to the two-wire supply and evaluation device.

The power supply 110 supplies the sensor electronics 111, the measuring electronics 112 and the communication circuit 113 with electric power and is itself supplied with power from the two-wire loop.

The energy store 1001 is arranged between the sensor loop interface 101 and the power supply 110. It is arranged centrally and acts as an energy buffer for all functional/circuitry units of the sensor. The functional units 111, 112, 113 are arranged in parallel with one another from the perspective of the energy store. The energy store 1001 is likewise supplied with power from the two-wire loop and ensures a direct equalisation of fluctuating energy consumption of the level measuring device 100.

The energy store should be designed for the most unfavourable case in terms of power and therefore have relatively large dimensions. Alternatively, a superordinate management unit can be provided, which coordinates the power distribution in order to prevent an undue discharge of the energy store, for example as a result of an excessive parallel consumption of power by various functional units. This management unit in turn means complex circuitry and allocates resources of the control unit.

As a result of the parallel arrangement of the functional units, prioritisation among the functional units is not possible. In the event that certain functional units are temporarily more important than other functional units, and less important functional units have to limit their function in favour of others in the event of a power shortage, this can be regulated by a superordinate management unit if need be. An automatic "priority" for important functional units, which priority is set automatically in terms of hardware, would, however, be desirable.

An interaction of the functional units can also occur because the inflowing power is distributed in parallel to all of the functional units and, if present, their associated energy stores. In the process, the distribution also depends on the charging/discharging state of the respective energy store.

Alternatively to the depicted level measuring device 100 in FIG. 1, the individual functional units can be arranged in series with respect to one another, therefore in particular in series with respect to the external power supply of the level measuring device, which external power supply is connected to the ports 118, 119.

The energy stores, inside the devices, required therefor are allocated to the individual functional units and adjusted to their requirements such that the size of each is designed for the energy requirement of the respective functional unit.

Additional decoupling circuits ensure an order of precedence for the distribution of the inflowing external power and/or prevent current flows to equalise the loads between the circuit blocks, which are separated from one another and contain said functional units (therefore in particular between an energy store in one block and a functional unit in the adjacent block).

Figure 2:
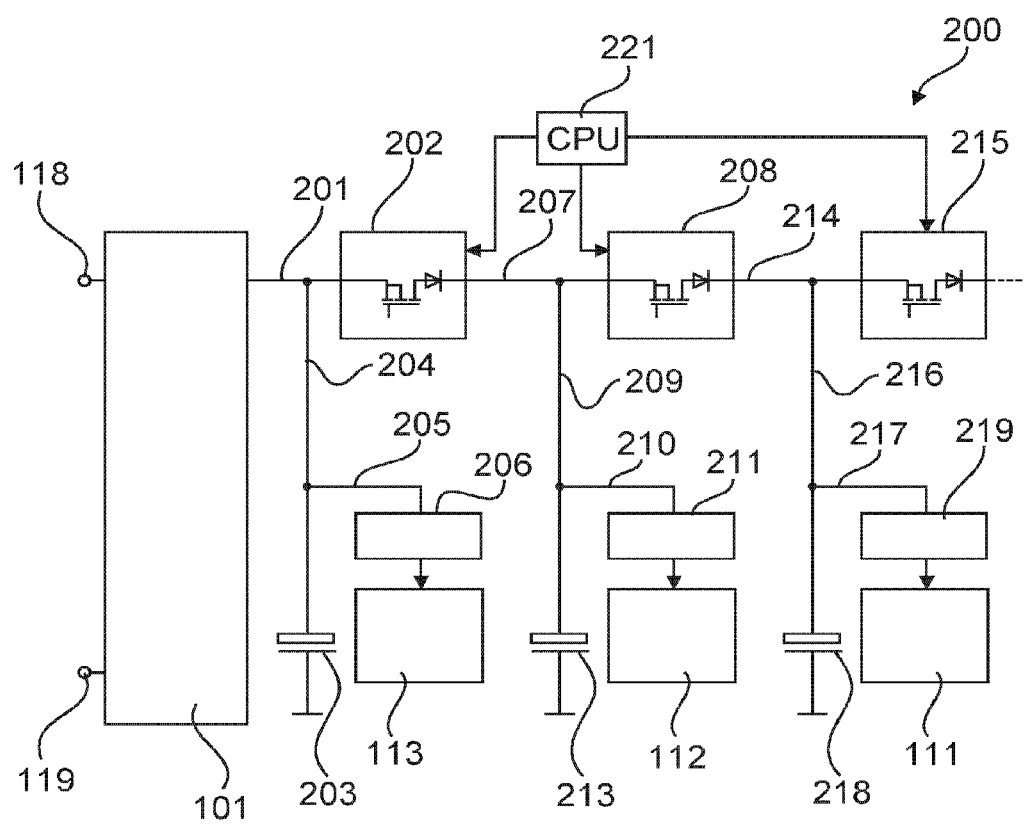
FIG. 2 is a block diagram of a level measuring device according to an embodiment.

FIG. 2 is a block diagram of a corresponding level measuring device 200. As also in the embodiment depicted in FIG. 1, the level measuring device 200 has a sensor loop interface 101, which is connected via the contacts 118, 119 to the external power supply (not shown). The power supply line 201 leaves the sensor loop interface 101 and supplies the individual functional units 111, 112, 113 of the level measuring device with power. In the embodiment depicted in FIG. 2, three circuit blocks can be seen, which, among themselves, are decoupled from one another by a decoupling circuits 202, 208. As a result of the further decoupling circuit 215 shown in addition, the depicted series connection can be continued by as many further circuit blocks, having further functional units, as desired, the decoupling from the preceding circuit blocks requiring such a decoupling circuit in each case. For a series connection using only three circuit blocks, the decoupling circuit 215 is, of course, omitted. The decoupling circuits are located in the power supply line 201, 207, 214 and they can be provided for a control unit 221 (e.g., a central processing unit (CPU)) to be provided, which can control the decoupling circuits. This applies to each of the embodiments described.

In the first circuit block, which comprises the first functional unit 113, there is a branch 204 from the power supply line 201, to which an energy store 203 is connected. This, and also the other energy stores 203, 213, 218, is, for example, a capacitor or accumulator.

The line 205, which connects the power supply line 201 to a power supply unit 206 that controls the power supply of the first functional unit 113, branches off from the line 204.

The two further circuit blocks shown in FIG. 2 are constructed similarly. They each have a branch line 209, 216, which branches off from the power supply line 207 and 214 respectively and connects the power supply line to an energy store 213, 218. A further branch 210, 217 is provided from the branch 209, 216 and leads to the power supply unit 211, 219, which controls the power supply of the second and third functional unit 112, 111 respectively.

A decoupling circuit 202, 208 is arranged in each case between the three circuit blocks.

Advantages of this arrangement can be seen, for example, in a simple production of an order of precedence with respect to the priority of the power supply. The functional unit, the function of which can be delayed for the longest time, is arranged, for example, at the end of the serial arrangement for power distribution (see functional unit 111). The functional unit that should be supplied with power first is arranged at the beginning of the serial arrangement (see functional unit 113).

The allocation of the energy stores 203, 213, 218 to the functional units 113, 112, 111 allows an adjustment according to requirements of the corresponding size of store to the requirement of the respective functional unit assigned to the energy store. By optimising store sizes, costs can be saved. Additionally, for each functional unit, an appropriate compromise can be set between the buffer effect of the storage unit and the start time, i.e., the time for charging the energy store, when the voltage supply of the current loop is switched on, with respect to the store size. Ideally, the buffers can be omitted entirely for certain functional units.

In addition, interaction of the functional units via the power supply is largely prevented.

An advantage of the disclosed embodiments is the provision of a level measuring device, in particular a level measuring device which functions according to the transit-time principle (radar, ultrasound, TDR), which has a plurality (at least two) of functional units, at least one of them having a highly fluctuating power consumption (for example peak power greater than a factor of 3 times the average load). The power consumption of the level measuring device from the external power supply source is at least temporarily constant and fixed by the external circumstances.

The individual functional units are arranged in series relative to one another with respect to the external power supply, and between the functional units, decoupling circuits are provided which provide, for example, the preferred distribution of the inflowing power and/or prevention of an undesirable redistribution of power between the individual functional units.

Furthermore, energy stores in the form of storage capacitors or accumulators are assigned at least to certain functional units, these storage capacitors or accumulators being required as energy buffers at least for those functional units in which the total of their own maximum power consumption and the maximum power consumption of the functional units arranged upstream thereof in the order of precedence exceeds the minimum value of the inflowing power. "Inflowing power" shall be understood to mean the power from the external power supply which is supplied to the sensor.

The following can apply to all embodiments: the first functional unit 113 is the functional unit that comes first in the series with respect to the power supply and its operation. The second functional unit 111 on the other hand, is the unit which comes last in the series. In between, further, third functional units 112 are possible in any desired quantity. A decoupling circuit is associated with the last functional unit and those located in between. Additionally, a buffer 218 is provided for the last functional unit. The buffers 203, 213 for the first and third functional unit are optional.

Figure 3:
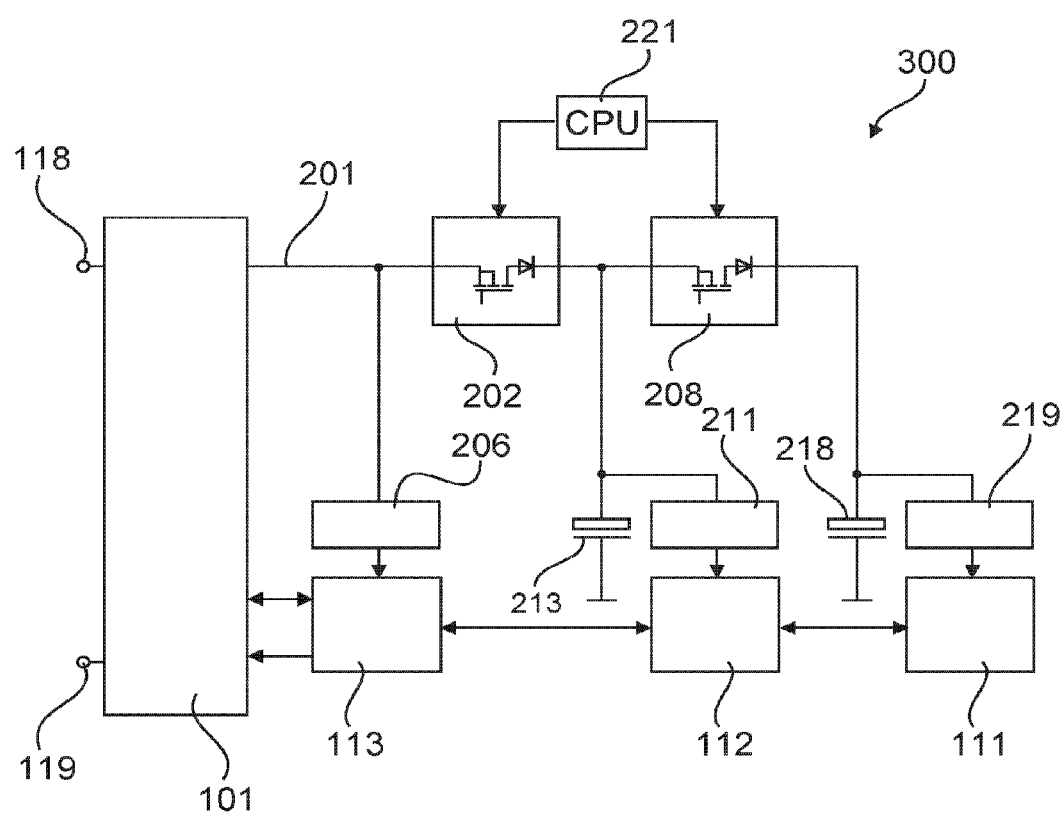
FIG. 3 is a block diagram of a level measuring device according to a further embodiment.

FIG. 3 is a block diagram of a level measuring device 300 according to a further embodiment. The three functional units shown are the communication circuit 113, the measuring circuit 112 and the sensor circuit 111. Precisely two decoupling circuits 202, 208 are provided. One is located between the circuit block, which comprises the communication circuit 113, and its power supply 206, and the circuit block, which comprises the measuring circuit 112 having the associated power supply 211 and the energy store 213. The second decoupling circuit 208 is located between the last-mentioned circuit block and the circuit block, which comprises the sensor circuit 111, the associated power supply 219 and the buffer energy store 218.

In the order of precedence with respect to the power supply, the communication unit 113 is located in the first place, i.e., closest to the supply ports 118, 119 and the sensor loop interface 101. This is because the function of the communication unit 113 should be available at all times. Its maximum power consumption is below the minimum power available at the output of the sensor loop interface 101. Therefore, an energy store can be omitted for this functional unit.

The next functional unit is the measuring circuit 112, which triggers a measurement of the sensor circuit 111, and for this reason is connected thereto for communication and then also evaluates this measurement.

Since the total maximum power requirement of the communication circuit 113 and of the measuring circuit 112 is higher than the minimum power available at the output of the sensor loop interface 101, an energy buffer for the measuring circuit 112 is provided by the energy store 213. Since the power deficit is not too great even in the most unfavourable case in terms of power, a relatively small energy store suffices. This has the advantage that when the voltage is switched on, this energy store 213 is charged relatively quickly and as a result, the measuring circuit has a relatively short start time.

The sensor circuit 111 is arranged at the end of the serial arrangement of the functional units because it does not have to be constantly available and its activation can be delayed for a certain time depending on the power situation. Since the ratio of the maximum power to the average power can be large, a relatively large energy store 218 is provided.

The charging of this energy store 218 and of the energy store 213 of the measuring circuit 112 is influenced by respective decoupling circuitry 202, 208. As a result of this, for example the charging can be limited or totally stopped in favour of the power consumption of the functional unit 113, or of units 113 and 112 ranked higher in the serial arrangement.

Figure 4:
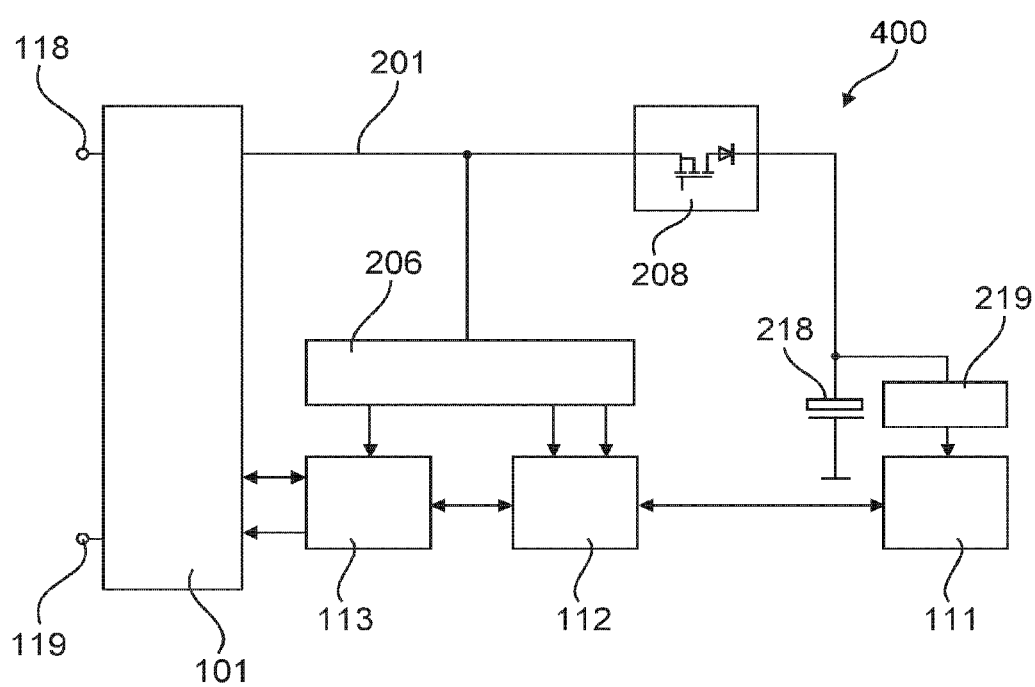
FIG. 4 is a block diagram of a level measuring device according to a further embodiment.

FIG. 4 is a block diagram of a level measuring device 400 according to a further embodiment. Unlike the embodiment in FIG. 3, the total of the maximum power consumption of the communication circuit 113 and the measuring circuit 112 is below the minimum power that is available at the output of the sensor loop interface 101. Therefore, the two together can be at the top of the power order of precedence and do not require their own energy store.

Therefore, only one single internal energy store 218 is provided in this embodiment and is associated with the circuit block of the sensor circuit 111 and its power supply unit 219 and can provide the sensor circuit 111 with buffer energy. The decoupling circuit 208 is located between this circuit block and the aforementioned functional units 113, 112.

Figure 5:
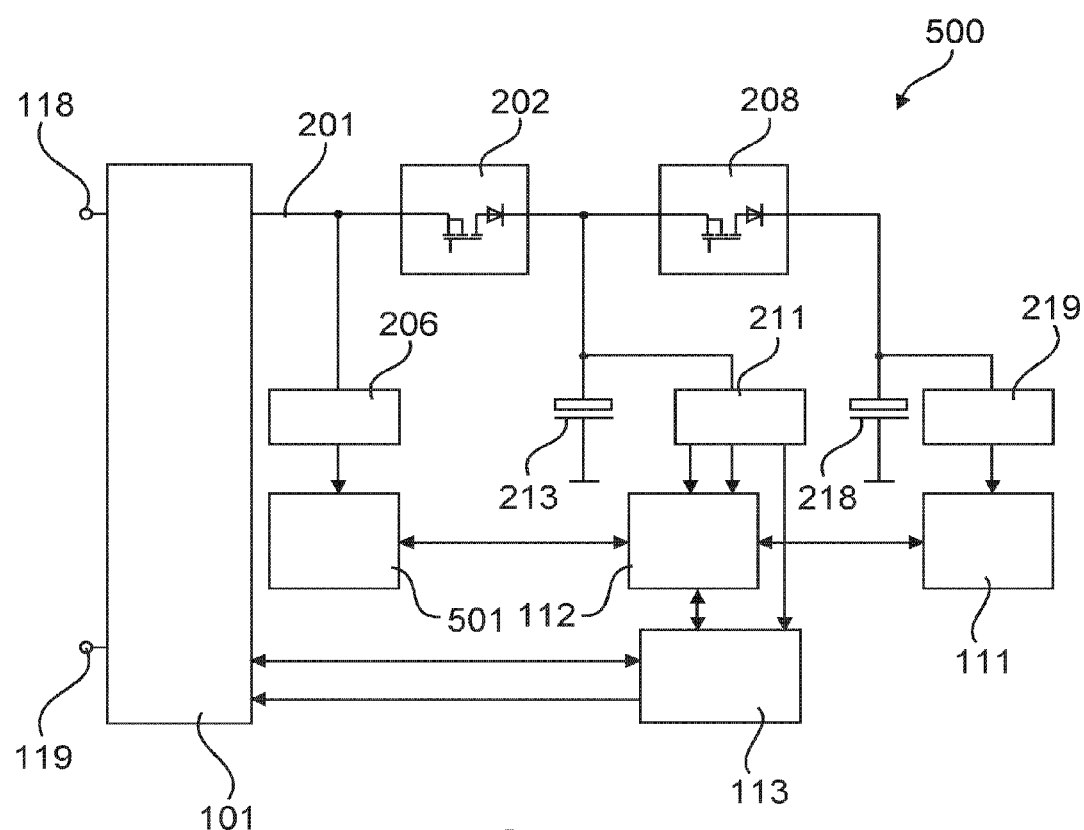
FIG. 5 is a block diagram of a level measuring device according to a further embodiment.

FIG. 5 is a block diagram of a level measuring device 500 according to an embodiment. Unlike FIG. 3, the functional units 111, 112, 113 here have been modified slightly. An air interface (wireless communication) 501, which would normally be regarded as part of the communication circuit 113, is separated here and placed in the top position in the power order of precedence because, for example, the measured value is transmitted in a wireless manner thereby.

The second communication circuit 113 (for example for the HART communication, for communication with the in-situ operator display and for outputting the loop current) is in second place of the serial arrangement together with the measuring circuit 112 and therefore in second place of the power order of precedence. By contrast with the air interface 501, it does require an energy store 213.

Therefore, two circuit blocks having their own energy stores 213, 218 are provided in the embodiment in FIG. 5 and are separated from one another and from the communication unit 501 by a decoupling circuit 202, 208.

Figure 6:
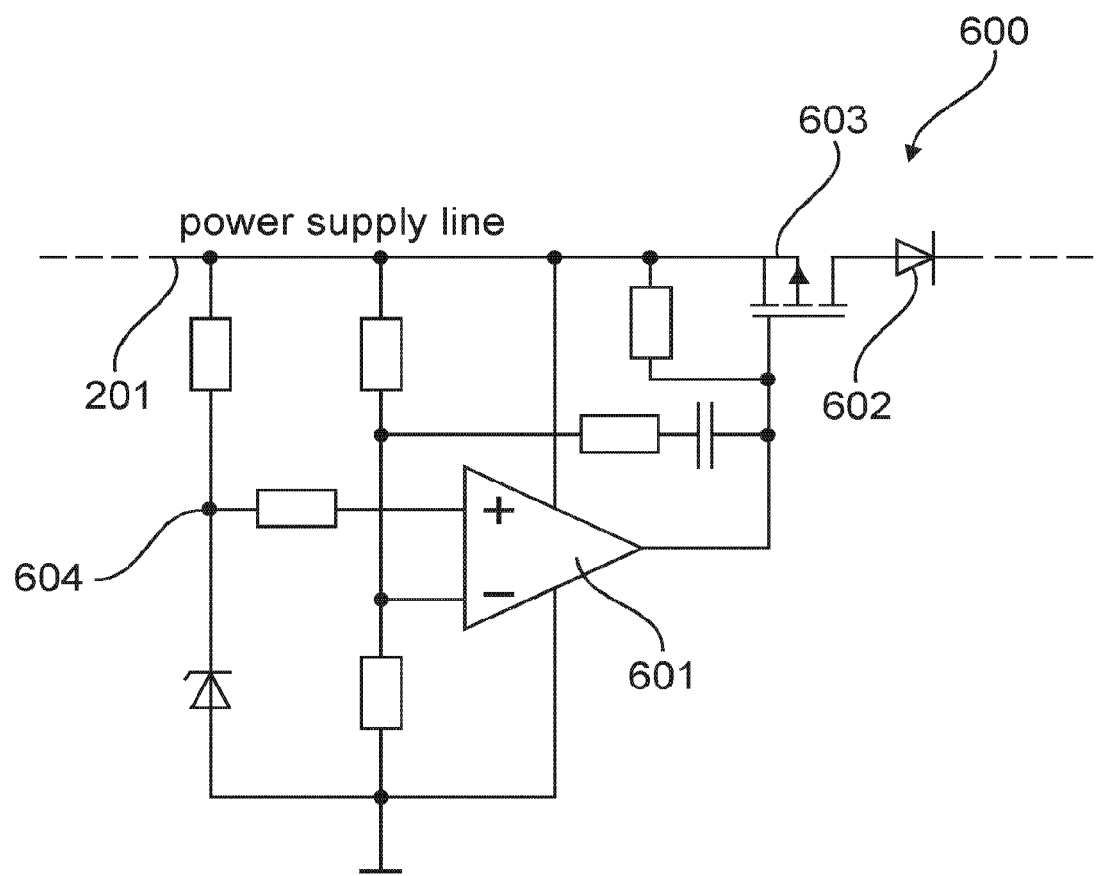
FIG. 6 is a block diagram of a decoupling circuit according to an embodiment.

FIG. 6 is a circuit diagram of a decoupling circuit 600 according to an embodiment, with which the charging of the downstream energy store can be influenced. A control circuit constructed on the basis of an operational amplifier 601 compares the voltage at the input line (power supply line) 201 with a reference voltage 604. Using the transistor 603, for example a field effect transistor, which is arranged in series relative to the power supply line 201, the control circuit can influence the current flow to the downstream functional units.

If the voltage at the power supply line 201 falls below a predetermined value as a result of a current power consumption which in total exceeds the inflowing power, for example the transistor is inhibited to the extent that the current flow is throttled or totally prevented. The downstream functional units must in this case either be switched off totally or be supplied by their own energy store.

The voltage limit at the power supply line 201, from which this occurs, results, for example, from the ratios of the maximum power consumption of the functional unit(s) arranged upstream of the decoupling circuit and the maximum current available at the power supply line 201. In the embodiment depicted in FIG. 5, the maximum power consumption of the wireless communication unit is 25 mW and the minimum current of the power supply line is 3.2 mA. This results in a voltage limit of 7.8 V. The control circuit of the decoupling circuit in FIG. 6 in this case is therefore set such that at the negative input of the operational amplifier 601, the voltage at the power supply line 201 is sensed and compared with the reference voltage 604 at the positive input of the operational amplifier 601. If the voltage at the power supply line 201 falls to a value of 7.8V, then the control operational amplifier 601 adjusts the path resistance of the field effect transistor (FET) 603 to a higher value such that the current flowing via the FET reduces and the voltage at the power supply line can thus stabilise to the value of 7.8V. Therefore, the control circuit, which is shown by way of example, of the decoupling circuit 202 ensures that the circuit blocks, which are located upstream of the decoupling circuit seen in the direction of power flow, can always be supplied with sufficient power. The circuit blocks, which are downstream of the decoupling circuit, accordingly only receive power which is not required by the circuit blocks located upstream thereof.

The adjustment of the decoupling circuit in FIG. 6 to a predefined value of the voltage at the power supply line 201 can be replaced in an embodiment, which is not shown, by an adjustment to a predefined value of the voltage drop inside the sensor loop interface 101 (see FIG. 1), for example the voltage drop via the series pass transistor of the current regulator 105. If the voltage drop increases by the series pass transistor, this indicates a currently higher total power consumption of the level measuring device in relation to power flowing in via the ports 118, 119. The control circuit must in this case react by reducing the current flowing at the output of the decoupling circuit such that said voltage drop does not increase further.

The decoupling circuit is therefore a circuit which is arranged in series in the power supply line 201, 207, 214 and adjusts the current flowing through such that an adequate power supply to the circuit blocks is ensured, which circuit blocks divert their power requirement before the decoupling circuit regarded in the direction of the power flow.

If a diode 602 is optionally additionally connected in series to the transistor 603, a rapid discharge of downstream energy stores is prevented when the voltage of the current loop is disconnected. This has the advantage that the power stored in the energy store can still be present, at least in part, when it is switched on again. In addition, a diode prevents equalising currents between different energy stores.

In addition, it should be pointed out that "comprising" and "having" do not exclude any other elements or steps and the indefinite article "a" or "an" does not exclude a plurality. Furthermore, it should be noted that features or steps that have been described with reference to one of the above embodiments can also be used in combination with other features or steps of other embodiments described above. Reference numerals in the claims are not to be regarded as limitations.

We claim:

1. A level measuring device, comprising:
    a first electrical circuit and a second electrical circuit connected in series;
    a first energy store, which is a first electrical energy buffer configured to equalise a fluctuating energy consumption of the second electrical circuit by being connected to a power supply of the second electrical circuit; and
    a first decoupling circuit disposed between the first electrical circuit and the second electrical circuit, and configured to distribute available electrical energy between the first electrical circuit and the second electrical circuit according to predetermined requirements of said circuits, wherein the first decoupling circuit comprises:
        a transistor, which is arranged between the first electrical circuit and the second electrical circuit,
        an operational amplifier, which is connected to the transistor and senses a voltage of the power supply, and
        a diode, which is connected in series with the transistor.

2. The level measuring device according to claim 1, wherein the first decoupling circuit is further configured to prevent a current flow from the first energy store to the first electrical circuit.

3. The level measuring device according to claim 1, wherein the first electrical circuit is disposed upstream of the second electrical circuit in the series connection with respect to a direction of current flow.

4. The level measuring device according to claim 1, further comprising:
    a third electrical circuit disposed between the first electrical circuit and the second electrical circuit and being connected in series with the first electrical circuit and the second electrical circuit; and
    a second decoupling circuit disposed between the first electrical circuit and the third electrical circuit, and configured to distribute the available electrical energy between the first electrical circuit and the third electrical circuit according to predetermined requirements of said circuits.

5. The level measuring device according to claim 4, further comprising:
    a second energy store, which is a second energy buffer configured to equalise a fluctuating energy consumption of the third electrical circuit.

6. The level measuring device according to claim 1, wherein the fluctuating energy consumption of the second electrical circuit is, at a maximum, more than three times greater than an average energy consumption of the second electrical circuit.

7. The level measuring device according to claim 1, wherein the first electrical circuit is a communication circuit.

8. The level measuring device according to claim 1, wherein the second electrical circuit is a measuring circuit or a sensor circuit.

9. The level measuring device according to claim 1, wherein the level measuring device is connected to a two-wire loop and supplied with energy for a measuring operation and is configured to communicate external to the device a measured value from the measuring operation.

10. The level measuring device according to claim 9, wherein the two-wire loop is a 4 mA-20 mA two-wire loop.

11. The level measuring device according to claim 1, further comprising:
    a control circuit configured to control the first decoupling circuit and the distribution of the available electrical energy between the first electrical circuit and the second electrical circuit according to the predetermined requirements of said circuits.

12. The level measuring device according to claim 4, further comprising:
a control circuit configured to control at least one of the first decoupling circuit and the second decoupling circuit, and at least one of the distribution of the available electrical energy between the first electrical circuit and the second electrical circuit according to the predetermined requirements of said circuits, and the distribution of the available electrical energy between the first electrical circuit and the third electrical circuit according to the predetermined requirements of said circuits.

* * * * *